US011494524B2

(12) United States Patent
Ringuette et al.

(10) Patent No.: US 11,494,524 B2
(45) Date of Patent: Nov. 8, 2022

(54) CHASSIS SECURITY SWITCH

(71) Applicant: LENOVO (Singapore) PTE. LTD., New Tech Park (SG)

(72) Inventors: Justin Michael Ringuette, Morrisville, NC (US); Robert Norton, Raleigh, NC (US); Sandy Collins, Durham, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 2 days.

(21) Appl. No.: 17/130,827

(22) Filed: Dec. 22, 2020

(65) Prior Publication Data

US 2022/0198076 A1 Jun. 23, 2022

(51) Int. Cl.
*G06F 21/86* (2013.01)
*G06F 21/31* (2013.01)
*G06F 1/18* (2006.01)
*G06F 1/24* (2006.01)

(52) U.S. Cl.
CPC .............. *G06F 21/86* (2013.01); *G06F 1/182* (2013.01); *G06F 1/24* (2013.01); *G06F 21/31* (2013.01)

(58) Field of Classification Search
CPC .......... G06F 21/86; G06F 21/31; G06F 1/182; G06F 1/24; G06F 21/44; G06F 21/00
See application file for complete search history.

(56) References Cited

U.S. PATENT DOCUMENTS

| | | | | |
|---|---|---|---|---|
| 5,287,619 A * | 2/1994 | Smith | ............... | H01L 23/49894 216/33 |
| 5,388,156 A * | 2/1995 | Blackledge, Jr. | ........ | G06F 21/86 726/19 |
| 6,105,136 A * | 8/2000 | Cromer | .................... | G06F 21/86 709/218 |
| 9,009,860 B2 * | 4/2015 | Klum | ..................... | G06F 21/86 726/34 |
| 9,665,870 B1 * | 5/2017 | Rezayee | ............ | G06Q 20/4012 |
| 9,799,180 B1 * | 10/2017 | Rezayee | ............... | G07F 7/1008 |
| 2020/0293697 A1 * | 9/2020 | Sion | .................... | G06F 9/45558 |

* cited by examiner

*Primary Examiner* — Hosuk Song
(74) *Attorney, Agent, or Firm* — Kunzler Bean & Adamson

(57) ABSTRACT

Apparatus that can detect chassis tamper events are disclosed. One apparatus includes a chassis including a secure area housing a secure element within the chassis and a security switch coupled between the chassis and the secure area. The security switch includes a switch and a processor in which the switch is configured to mechanically trigger to a tamper state from a non-tamper state in response to a chassis tamper event occurring between the chassis and the secure area and to be electrically reset to the non-tamper state from the tamper state in response to receiving a reset signal from the processor. Methods and computer program products that can perform chassis tamper event and switch reset functions for the apparatus are also disclosed.

20 Claims, 10 Drawing Sheets

CHASSIS SECURITY SWITCH

FIELD

The subject matter disclosed herein relates to device security and more particularly relates to a security switch for a device chassis.

DESCRIPTION OF THE RELATED ART

Unauthorized tampering with a device can present a number of issues for an owner of the device. Specifically, an unauthorized entity can access sensitive and/or secure elements and/or data in a device by opening the chassis of the device to access the sensitive and/or secure elements and/or data housed therein.

Conventional solutions to detect whether the chassis of a device has been tampered with typically require that a security mechanism have at least auxiliary power supplied to it for the security mechanism to detect a chassis tamper event. While conventional security mechanisms can detect chassis tamper events, there are drawbacks to such security mechanisms.

A drawback to conventional security mechanisms is that a chassis tamper event can only be detected when power is being supplied to the security mechanism. Another related drawback to conventional security mechanisms is that because a chassis tamper event cannot be detected when power is not being supplied to the security mechanism, conventional security mechanisms consider a loss of power a chassis tamper event even though a chassis tamper may not have occurred because there is no way of knowing whether a chassis tamper event occurred during a power loss. Therefore, to ensure that a chassis tamper event did not occur, a loss of power situation is treated, by default, as a chassis tamper event.

BRIEF SUMMARY

Apparatus that can detect a chassis tamper event are disclosed. Methods and computer program products that can perform chassis tamper event and switch reset functions for the apparatus are also disclosed.

In one embodiment, an apparatus includes a chassis including a secure area housing a secure element within the chassis and a security switch coupled between the chassis and the secure area. The security switch includes a switch and a processor in which the switch is configured to mechanically trigger to a tamper state from a non-tamper state in response to a chassis tamper event occurring between the chassis and the secure area and to be electrically reset to the non-tamper state from the tamper state in response to receiving a reset signal from the processor. Methods and computer program products that can perform chassis tamper event and switch reset functions for the apparatus are also disclosed.

A method, in one embodiment, includes receiving, by a processor, a trigger signal from a switch that a tamper state of the switch has been mechanically triggered from a non-tamper state to the tamper state in response to a chassis tamper event occurring between a chassis and a secure area housing a secure element. The method further includes transmitting, by the processor, a reset signal to the switch to electrically reset the switch from the tamper state to the non-tamper state.

In one embodiment, a program product includes a computer-readable storage medium that stores code executable by a processor. The executable code, in certain embodiments, includes code to receive a trigger signal from a switch that a tamper state of the switch has been mechanically triggered from a non-tamper state to the tamper state in response to a chassis tamper event occurring between a chassis and a secure area housing a secure element. The executable code, in some embodiments, further includes code to transmit a reset signal to the switch to electrically reset the switch from the tamper state to the non-tamper state.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
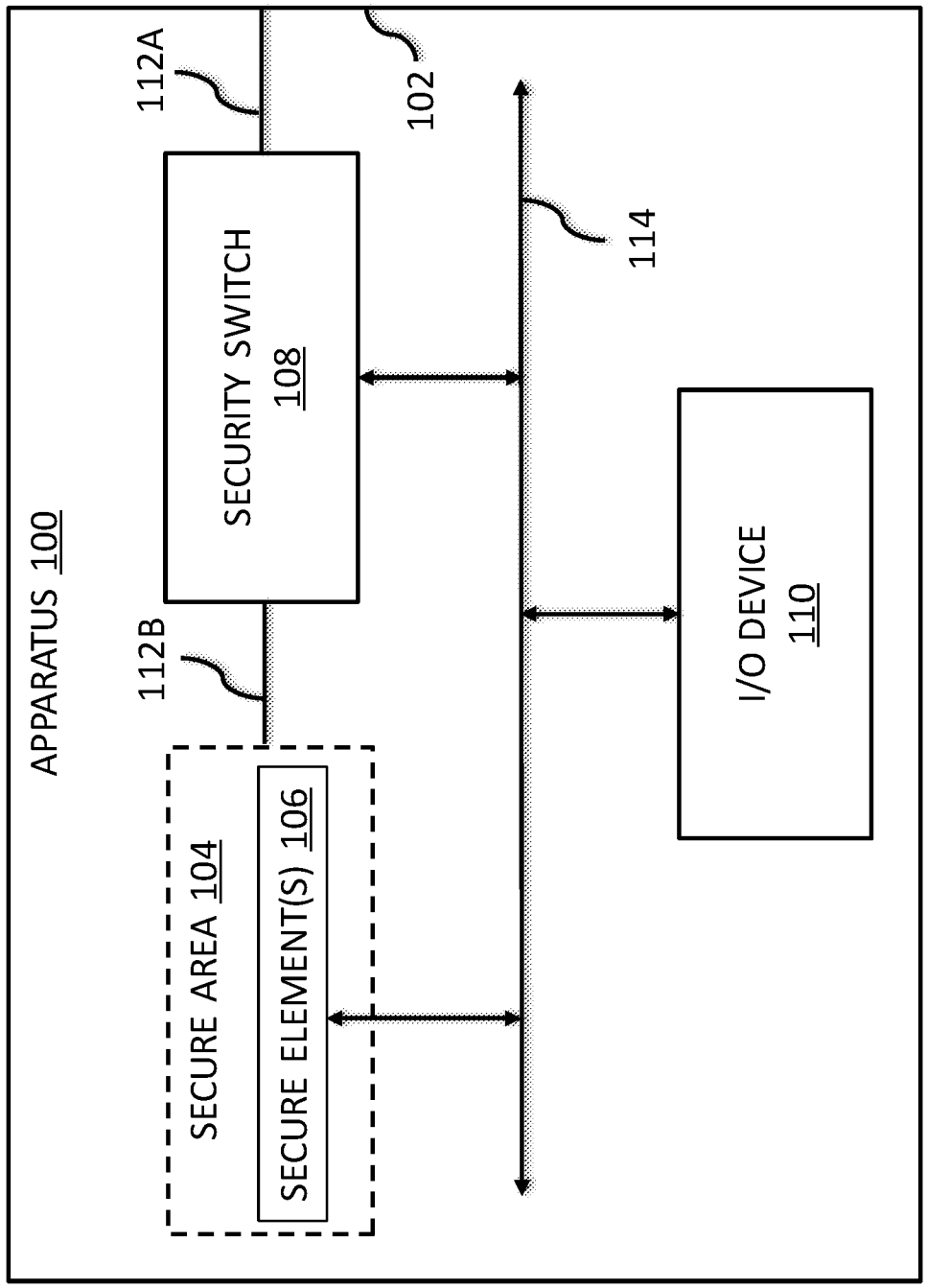
FIG. 1 is a schematic block diagram of one embodiment of an apparatus that includes chassis tamper event detection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms a, an, and the also refer to one or more unless expressly specified otherwise.

In addition, as used herein, the term set can mean one or more, unless expressly specified otherwise. The term sets can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With reference now to the drawings, FIG. 1 is a schematic block diagram of one embodiment of an apparatus 100 (and/or system) that includes chassis tamper event detection. The apparatus 100 can include any suitable apparatus and/or component that includes and/or can include a chassis 102. Examples of an apparatus 100 include, but are not limited to, an information handling device (e.g., a computing device, a computing system, and/or a computing network), one or more computer system and/or network components (e.g., a computer server, a router, a network switch, etc.), one or more computing device components (e.g., a monitor/display, a touch screen, a keyboard, a mouse, a touch pad, a trackball, a joystick, a camera, a printer, a router, a switch, etc.), a cellular telephone, a personal digital assistant (PDA), a smart device (e.g., a smart watch, etc.), a wearable device, and/or an internet of things (IoT) device, among other systems, devices, and/or components that can include a chassis 102 that are possible and contemplated herein.

In various embodiments, the apparatus 100 includes an information handling device. In some embodiments, the information handling device includes a laptop computing device. In other embodiments, the information handling device includes a desktop computing device. In still other embodiments, the information handling device can include a combination laptop computing device and desktop computing device.

At least in the illustrated embodiment, the apparatus 100 includes, among other components, a chassis 102, a secure area 104 that houses one or more secure elements 106, a security switch 108, and an input/output (I/O) device 110. The chassis 102 may include any suitable structure and/or material that can house the secure area 104, the secure element(s) 106, the security switch 108, and the I/O device 110, among other components that can be housed within a chassis 102 that are possible and contemplated herein.

In various embodiments, the chassis 102 is closed and/or sealed. In certain embodiments, the chassis 102 is openable and/or re-sealable. In alternative embodiments, the chassis 102 is not openable and/or re-sealable.

The secure area 104 may include any suitable area that can house, store, and/or include any type of sensitive, private, secret, classified, important, proprietary, and/or confidential element(s) and/or data. At least in the illustrated embodiment, the secure area houses one or more secure elements 106.

A secure element 106 may include any suitable type of sensitive, private, secret, classified, important, proprietary, and/or confidential element(s), component(s), device(s), and/or data. In certain embodiments, the secure element 106 includes the motherboard of a computing device, among other types of elements, devices, and/or components that are possible and contemplated herein. In additional embodiments, the motherboard includes one or more sensitive, private, secret, classified, important, proprietary, and/or confidential elements, components, and/or devices (e.g., one or more memory devices, one or more I/O devices, one or more buses, and/or one or more processing devices, etc., among other elements, components and/or devices that are possible and contemplated herein). In further additional embodiments, the one or more elements, components, and/or devices on the motherboard include(s) and/or store(s) one or more types of sensitive, private, secret, classified, important, proprietary, and/or confidential data and/or material(s).

In some embodiments, the sensitive, private, secret, classified, important, proprietary, and/or confidential data and/or material(s) are related to the apparatus 100 and/or to the operations/functions of the apparatus 100. In additional or alternative embodiments, the sensitive, private, secret, classified, important, proprietary, and/or confidential data and/or material(s) are related to one or more components, devices, and/or systems, and/or to the operations/functions thereof, that are external to the apparatus 100.

In certain embodiments, the sensitive, private, secret, classified, important, proprietary, and/or confidential data and/or material(s) are related to the entity that owns and/or controls the apparatus 100. In additional or alternative embodiments, the sensitive, private, secret, classified, important, proprietary, and/or confidential data and/or material(s) are related to one or more entities associated with and/or in competition with the entity that owns and/or controls the apparatus 100. In further additional or alternative embodiments, the sensitive, private, secret, classified, important, proprietary, and/or confidential data and/or material(s) are related to one or more entities not associated with and/or that are external to the entity that owns and/or controls the apparatus 100.

A security switch 108 may include any suitable structure that can detect a mechanical tamper event on a chassis and be electrically reset. That is, the security switch 108 may include any suitable structure that can be mechanically triggered (e.g., tripped from a non-tamper state to a tamper state) and any suitable circuitry that can electrically reset the mechanically triggerable structure (e.g., reset from the tamper state to the non-tamper state).

In various embodiments, the security switch 108 includes a re-settable latching switch, which can include any suitable electrically re-settable latching switch and/or structure that can perform the functions of a latching switch and that can be electrically reset. In certain embodiments, the security switch 108 includes a re-settable latching electromechanical push button switch.

Figure 2A:
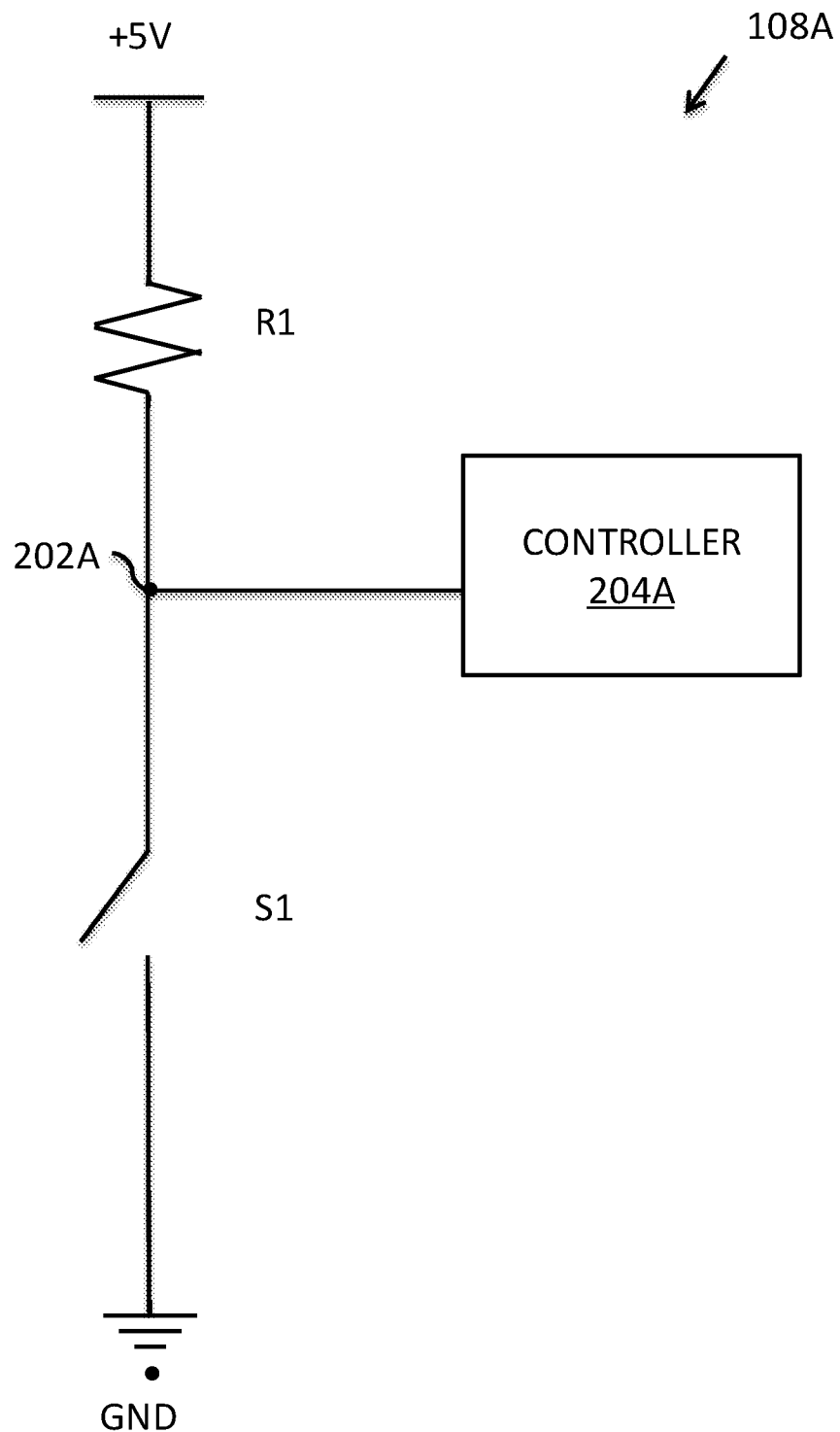
FIG. 2A is a schematic block diagram of one embodiment of a security switch that can be included in the apparatus illustrated in FIG. 1.

Some embodiments of the security switch 108 include a pull-up resistor circuit, as illustrated in FIG. 2A. In the example embodiment illustrated in FIG. 2A, a pull-up resistor circuit implemented as a security switch 108A includes a voltage source (e.g., a +5V source) coupled to a resistor R1, which can include any suitable resistance in the range of about 2 kΩ to about 4.7 kΩ, among other sized ranges, ranges, and/or resistances that are possible and contemplated herein. The resistor R1 is further coupled to a node 202 and the node 202 is coupled to a switch S1 and a controller 204A, and the switch S1 is further coupled to ground GND.

The switch S1, in various embodiments, includes a re-settable latching electromechanical push button switch. In certain embodiments, the latching electromechanical push button switch is mechanically triggered (e.g., tripped from a non-tamper state to a tamper state) by the chassis 102 being opened and electrically reset (e.g., reset from the tamper state to the non-tamper state) by the controller 204A, as discussed elsewhere herein.

The controller 204A includes one or more processing devices (e.g., processor(s)) for executing instructions in one or more applications configured to cause the controller 204A to perform tamper security operations, among other operations that are possible and contemplated herein. In various embodiments, the tamper security operations comprise receiving (e.g., from the switch S1) a trigger signal indicating that a chassis tamper event has occurred and/or has been detected, notifying a user (e.g., via I/O device 110) of the chassis tamper event, receiving one or more authentication inputs from a user (e.g., via I/O device 110), validating the authentication input(s) to verify that a user is an authorized user, and electrically resetting the switch S1 (e.g., via a reset signal) in response to receiving one or more instructions and/or commands from an authorized user, each of which is discussed elsewhere herein.

Figure 2B:
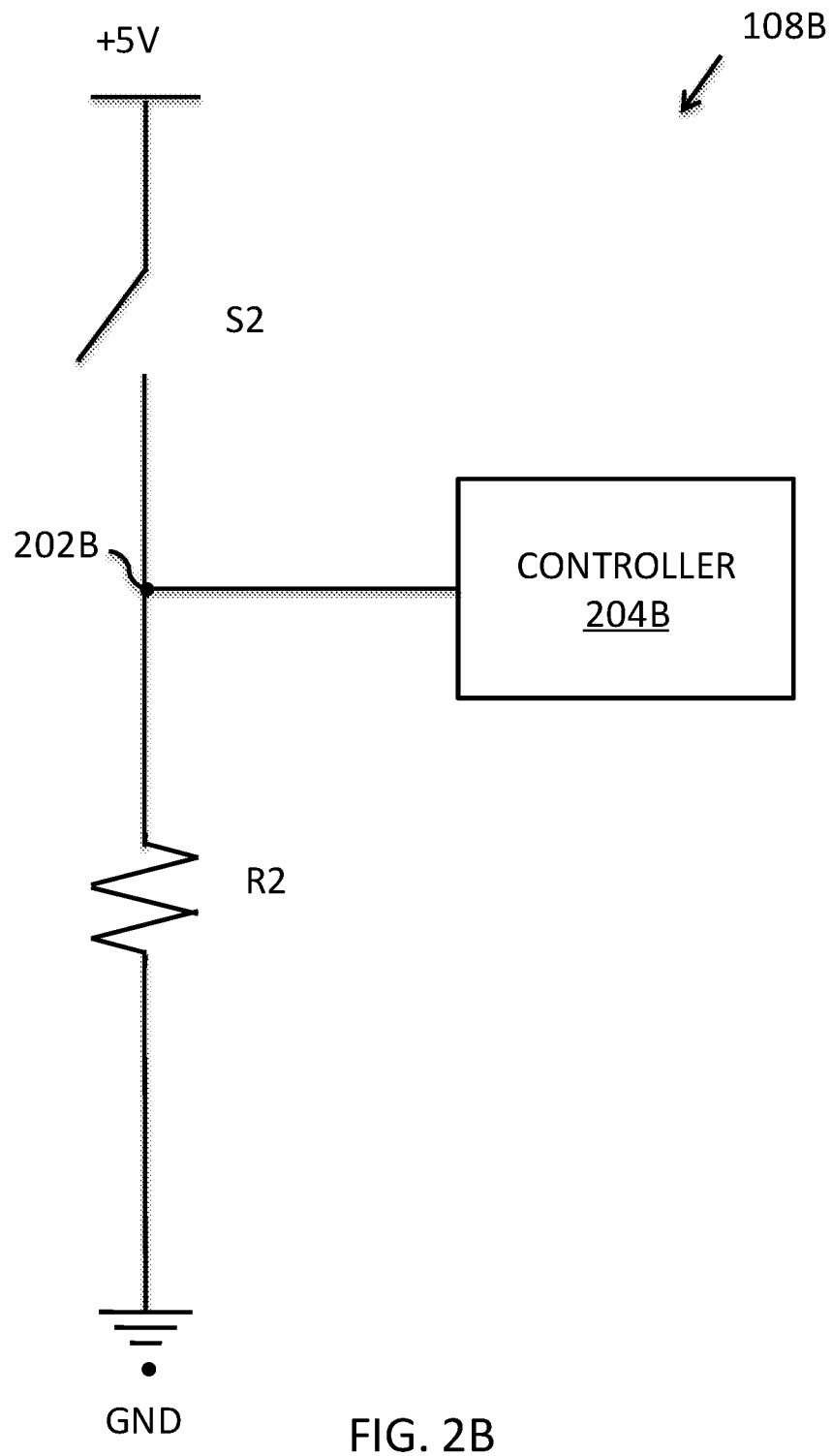
FIG. 2B is a schematic block diagram of another embodiment of a security switch that can be included in the apparatus illustrated in FIG. 1.

Additional embodiments of the security switch 108 include a pull-down resistor circuit, as illustrated in FIG. 2B. In the example embodiment illustrated in FIG. 2B, a pull-down resistor circuit implemented as a security switch 108B includes a voltage source (e.g., a +5V source) coupled to a switch S2.

The switch S2, in various embodiments, includes a re-settable latching electromechanical push button switch. In certain embodiments, the latching electromechanical push button switch is mechanically triggered (e.g., tripped from a non-tamper state to a tamper state) by the chassis 102 being opened and electrically reset (e.g., reset from the tamper state to the non-tamper state) by a controller 204B, as discussed elsewhere herein.

The switch S2 is coupled to a node 202B. In addition, the node 202B is coupled to the controller 204B and to a resistor R2.

The controller 204B includes one or more processing devices (e.g., processor(s)) for executing instructions in one or more applications configured to cause the controller 204B to perform tamper event security operations, among other operations that are possible and contemplated herein. In various embodiments, the tamper security operations comprise receiving (e.g., from the switch S2) a trigger signal indicating that a chassis tamper event has occurred and/or has been detected, notifying a user (e.g., via I/O device 110) of the chassis tamper event, receiving one or more authentication inputs from a user (e.g., via I/O device 110), validating the authentication input(s) to verify that a user is an authorized user, and electrically resetting the switch S2 (e.g., via a reset signal) in response to receiving one or more instructions and/or commands from an authorized user, each of which is discussed elsewhere herein.

The resistor R2, which can include any suitable resistance in the range of about 4.7 kΩ to about 4.7 kΩ, among other sized ranges, ranges, and/or resistances that are possible and contemplated herein. As shown, the resistor R2 is further coupled to ground GND.

As illustrated in FIG. 1, the security switch 108 is physically coupled to the chassis 102 via a physical coupling 112A. In addition, the security switch 108 is physically coupled to the secure area 104 and/or the secure element 106 via a physical coupling 112B. In other words, the security switch 108 is physically coupled between the chassis 102 and the secure area 104 and/or the secure element 106 via physical couplings 112A and 112B, respectively.

The physical couplings 112A and 112B may include any suitable type of physical coupling that is known or developed in the future that can attach and/or couple the security switch 108 to and/or between the chassis 102 and the secure area 104 and/or the secure element 106. In various embodiments, the physical couplings 112A and 112B may include any suitable type of physical coupling that can physically trigger the security switch 108 to indicate that a tamper event has occurred in response to the chassis 102 being opened and/or compromised.

In certain embodiments, the chassis 102 being opened and/or compromised (e.g., a tamper event) can be defined as the chassis 102 being opened and/or the chassis 102 being opened greater than a predetermined amount (e.g., any suitable amount greater than zero millimeters (0 mm), among other situations indicative of the chassis 102 being opened and/or compromised (e.g., a tamper event) that are possible and contemplated herein. In additional or alternative embodiments, the chassis 102 being opened and/or compromised (e.g., a tamper event) can be defined as the chassis 102 and the secure area 104 and/or the secure element 106 being separated from one another and/or the chassis 102 and the secure area 104 and/or the secure element 106 being separated from one another greater than a predetermined amount (e.g., any suitable amount greater than 0 mm), among other situations indicative of the chassis 102 being opened and/or compromised (e.g., a tamper event) that are possible and contemplated herein.

The physical triggering of the security switch 108 indicative of a tamper event may be manifest via any suitable type of indicator. In some embodiments, the physical triggering of the security switch 108 indicative of a tamper event is manifest via a push button trigger on the security switch 108 (e.g., a button on switch S1 or S2 being depressed, released, actuated, opened or closed, etc.).

In some embodiments, the physical trigger opens (e.g., shorts to GND) the switch S1 or closes the switch S2. In this manner, a tamper event can be indicated, detected, and/or determined by the controller 204A or 204B in response to the controller 204A or 204B failing to detect a voltage (or detecting a logic low or logic 0) at the node 202A or 202B, respectively.

In other embodiments, the physical trigger closes the switch S1 or opens (e.g., shorts to the voltage source (+5V)) the switch S2. In this manner, a tamper event can be indicated, detected, and/or determined by the controller 204A or 204B in response to the controller 204A or 204B detecting a voltage (or detecting a logic high or logic 1) at the node 202A or 202B, respectively.

Controller(s) 204A and/or 204B may include any suitable controller and/or controlling device that is known or developed in the future. In certain embodiments, the controller(s) 204A and/or 204B includes a microcontroller or microcontroller unit (MCU). As discussed previously, the controller(s) 204A and/or 204B can include one or more processing devices (e.g., processor(s)) for executing instructions in one or more applications configured to cause the controller(s) 204A and/or 204B to perform tamper event security operations.

Figure 3A:
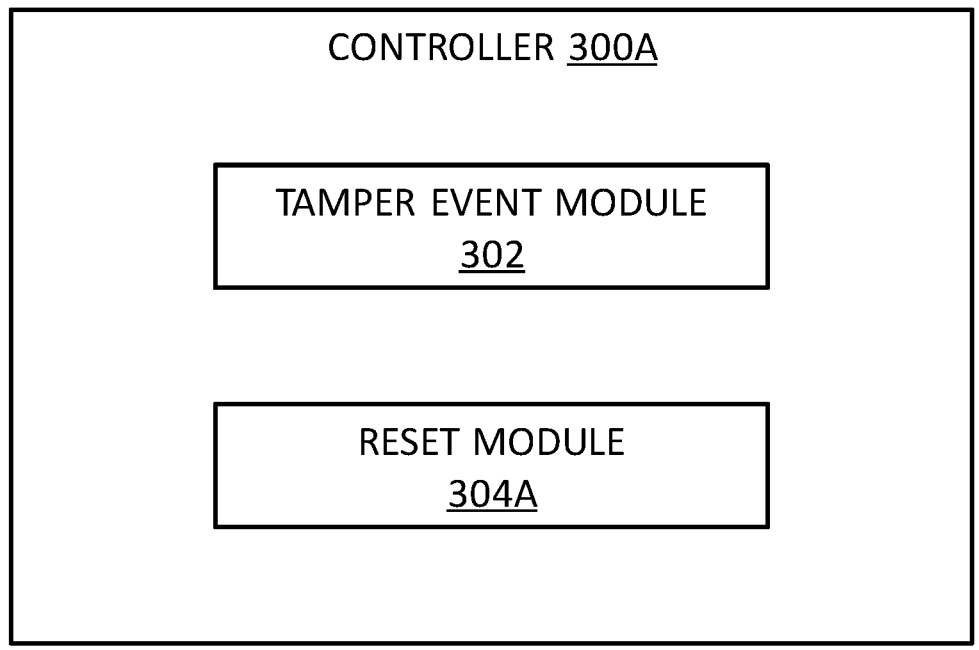
FIG. 3A is a schematic block diagram of one embodiment of a controller that can be included in the security switch illustrated in FIGS. 2A and/or 2B.

With reference to FIG. 3A, FIG. 3A illustrates one embodiment of a controller 300A corresponding to the controller(s) 204A and/or 204B. At least in the illustrated embodiment, the controller 300A includes, among other components, a tamper event module 302 and a reset module 304A.

A tamper event module 302 may include any suitable hardware and/or software that can detect and/or determine a tamper event on chassis 102 (e.g., a chassis tamper event). In various embodiments, the tamper event module 302 can monitor a switch S1 or S2 and detect and/or determine a tamper event on chassis 102 based on a voltage and/or a logic condition at a node (e.g., node(s) 202A and/or 202B) coupled to the switch S1 or S2.

In certain embodiments, the tamper event module 302 is configured to detect and/or determine that chassis 102 has experienced a tamper event in response to the node 202A or 202B including a voltage, as discussed elsewhere herein. In additional or alternative embodiments, the tamper event module 302 is configured to detect and/or determine that chassis 102 has experienced a tamper event in response to the node 202A or 202B including a logic high or a logic 1, as discussed elsewhere herein.

In some embodiments, the tamper event module 302 is configured to detect and/or determine that chassis 102 has experienced a tamper event in response to the node 202A or 202B failing to include a voltage (e.g., 0V), as discussed elsewhere herein. In additional or alternative embodiments, the tamper event module 302 is configured to detect and/or determine that chassis 102 has experienced a tamper event in response to the node 202A or 202B including a logic low or a logic 0, as discussed elsewhere herein.

A reset module 304A may include any suitable hardware and/or software that can electrically reset a security switch 108 (e.g., a physical and/or mechanical switch). The reset module 304A may electrically reset a physical and/or mechanical switch (e.g., a security switch 108) using any suitable technique that is known or developed in the future. In various embodiments, the reset module 304A can electrically reset a physical and/or mechanical switch by selectively opening (or shorting) or closing the physical and/or mechanical switch after the physical and/or mechanical switch has been tripped and/or triggered.

In certain embodiments, the reset module 304A is configured to reset the switch S1 of a pull-up resistor circuit forming a security switch 108A by opening (or shorting to GND) the switch S1. In alternative embodiments, the reset module 304A is configured to reset the switch S1 of a pull-up resistor circuit forming a security switch 108A by closing the switch S1.

In other embodiments, the reset module 304A is configured to reset the switch S2 of a pull-down resistor circuit forming a security switch 108B by opening (or shorting to the +5V source) the switch S1. In alternative embodiments, the reset module 304A is configured to reset the switch S2 of a pull-down resistor circuit forming a security switch 108B by closing the switch S2.

Figure 3B:
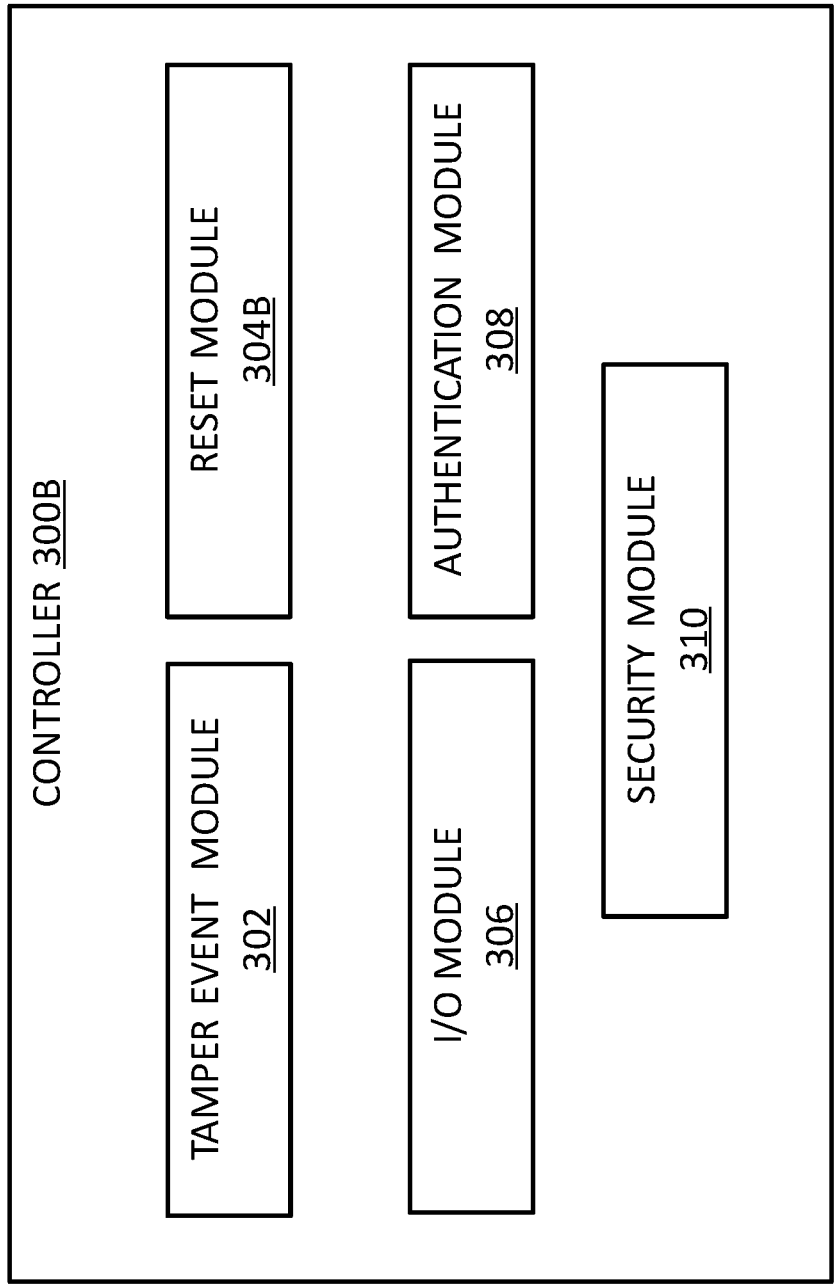
FIG. 3B is a schematic block diagram of another embodiment of a controller that can be included in the security switch illustrated in FIGS. 2A and/or 2B.

Referring now to FIG. 3B, FIG. 3B illustrates another embodiment of a controller 300B corresponding to the controller(s) 204A and/or 204B. The controller 300B includes a tamper event module 302 similar to the controller 300A discussed elsewhere herein. At least in the illustrated embodiment, the controller 300B further includes, among other components, an I/O module 306, an authentication module 308, a reset module 304B, and a security module 310.

An I/O module 306 may include any suitable hardware and/or software that can enable the controller 300B to communicate with a user. In various embodiment, the I/O module 306 is able to communicate with the user via the I/O device 110.

In some embodiments, the I/O module 306 is configured to notify a user that a chassis tamper event has been detected and/or determined by the tamper event module 302. In additional or alternative embodiments, the I/O module 306 is configured to notify a user that one or more secure elements 106 has/have been turn OFF by the security module 310, as discussed elsewhere herein.

In certain embodiments, the I/O module 306 is configured to prompt a user to provide one or more authentication inputs so that the security switch 108 can be reset and/or to turn ON the one or more secure elements 106 has/have been turn OFF by the security module 310, as discussed elsewhere herein. The authentication input(s) can include any suitable user input that can identify the user as an authorized user. Example authentication inputs can include, but are not limited to, a password, a biometric input, and/or a pattern input, etc., among other user inputs capable of identifying the user as an authorized user that are possible and contemplated herein. The I/O module 306 is further configured to receive the user input(s) and transmit the user input(s) to the authentication module 308.

An authentication module 308 may include any suitable hardware and/or software that can verify one or more user inputs to authenticate that a user is an authorized user. The authentication module 308 can verify that a user is an authorized user based on one or more received user inputs using any suitable verification technique and/or method that is known of developed in the future. In various embodiments, the authentication module 308 can verify that a user is an authorized user by matching one or more current user inputs to a stored set of verified user inputs, among other verification techniques and/or methods that are possible and contemplated herein.

In some embodiments, the authentication module 308 is configured to transmit a verification signal to the reset module 304B in response to verifying that the user is an authorized user. In additional embodiments, the authentication module 308 is further configured to transmit the verification signal to the security module 310 in response to verifying that the user is an authorized user. In certain embodiments, the authentication module 308 is configured to do nothing and/or continue to wait for a user to be authenticated as an authorized user in response to determining that the current user is not an authorized user (e.g., the current user input(s) do not match the stored set of verified user inputs).

A reset module 304B may include any suitable hardware and/or software that can electrically reset a security switch 108 (e.g., a physical and/or mechanical switch). The reset module 304B may electrically reset a physical and/or mechanical switch (e.g., a security switch 108) using any suitable technique that is known or developed in the future. In various embodiments, the reset module 304B can electrically reset a physical and/or mechanical switch by selectively opening (or shorting) or closing the physical and/or mechanical switch after the physical and/or mechanical switch has been tripped and/or triggered.

In certain embodiments, the reset module 304B is configured to reset the switch S1 of a pull-up resistor circuit forming a security switch 108A by opening (or shorting to GND) the switch S1. In alternative embodiments, the reset module 304A is configured to reset the switch S1 of a pull-up resistor circuit forming a security switch 108A by closing the switch S1.

In other embodiments, the reset module 304B is configured to reset the switch S2 of a pull-down resistor circuit forming a security switch 108B by opening (or shorting to the +5V source) the switch S1. In alternative embodiments, the reset module 304A is configured to reset the switch S2 of a pull-down resistor circuit forming a security switch 108B by closing the switch S2.

In some embodiments, the reset module 304B is configured to receive the verification signal from the authentication module 308. In further embodiments, the reset module 304B is further configured to reset the security switch 108 in response to receiving the verification signal from the authentication module 308.

A security module 310 may include any suitable hardware and/or software that can control the one or more secure elements 106 in the apparatus 100. In various embodiments, the security module 310 is configured to selectively turn ON and OFF the secure element(s) 106 in the apparatus 100.

In some embodiment, the security module 310 is configured to turn OFF one or more of the secure element(s) 106 in response to the tamper event module 302 detecting and/or determining that the chassis has experienced a tamper event. In additional or alternative embodiments, the security module 310 is configured to turn ON the one or more secure elements 106 that were previously turned OFF in response to the security switch 108 being reset by reset module 304B and/or a user being verified as an authorized user by the authentication module 308. In further additional or alternative embodiments, the security module 310 is configured to receive the verification signal from the authentication module 308 and turn ON the one or more secure elements 106 that were previously turned OFF in response to receiving the verification signal from the authentication module 308.

As further illustrated in FIG. 1, the security switch 108 is coupled to and/or in communication with the secure element(s) 106 and the I/O device 110 via a bus 114 (e.g., a wired and/or wireless bus). The I/O device 110 may include any suitable input/output device that is known or developed in the future that can allow and/or enable the controllers 204A, 204B, 300A, and/or 300B to communicate and/or exchange data (e.g., send and receive signals and/or data). Examples of an I/O device 110 include, but are not limited to, a keyboard, a monitor, a touchscreen, a mouse, a trackball, and a joystick, etc., among other types of input/output devices that are possible and contemplated herein.

Figure 4:
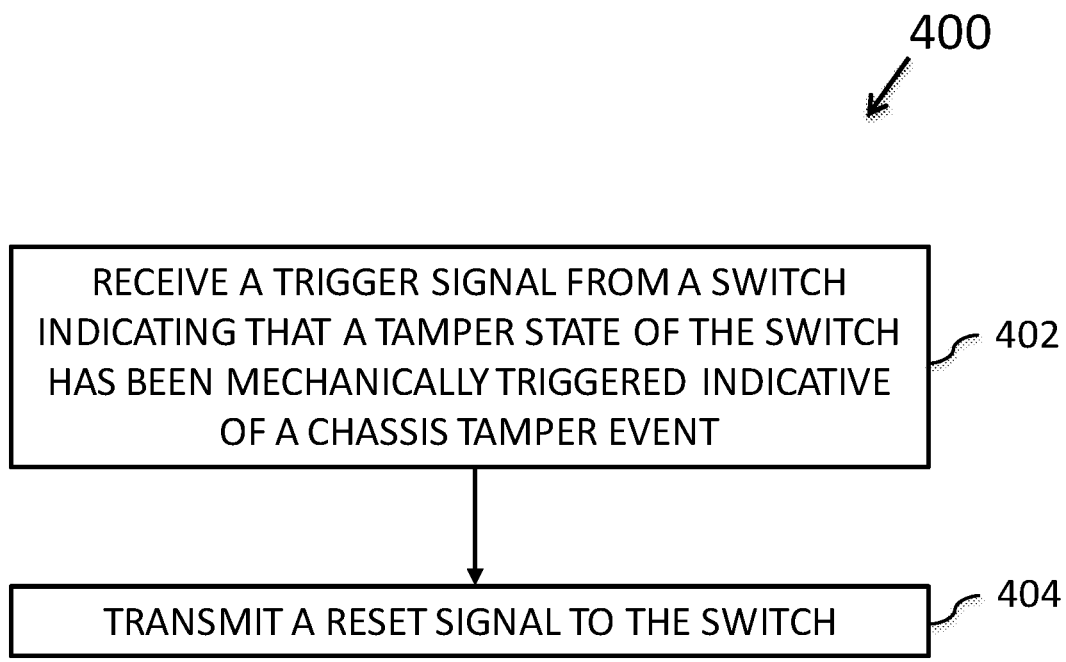
FIG. 4 is a schematic flow chart diagram illustrating one embodiment of a chassis security method for an apparatus.

FIG. 4 is a schematic flow chart diagram illustrating one embodiment of a chassis security method 400 for an apparatus 100. At least in the illustrated embodiment, the method 400 begins by a controller 204A, 204B, 300A, or 300B (e.g., one or more processors) receiving a trigger signal from a switch (e.g., switch S1 or S2) in a security switch 108 indicating that a tamper state of the switch S1 or S2 has been mechanically triggered and/or tripped (block 402). In some embodiments, the tamper state of the switch S1 or S2, in some embodiments, indicates that a chassis 102 has experienced a chassis tamper event. In other words, the chassis 102 has been opened and/or compromised.

The method 400 further includes the controller 204A, 204B, 300A, or 300B (e.g., one or more processors) transmitting a reset signal to the switch S1 or S2 to reset the switch S1 or S2 (block 404). The switch S1 or S2 may be reset using any of the reset techniques and/or methods discussed elsewhere herein. In some embodiments, the reset signal is transmitted to the switch S1 or S2 in response to receiving a user input to reset the switch S1 or S2.

Figure 5:
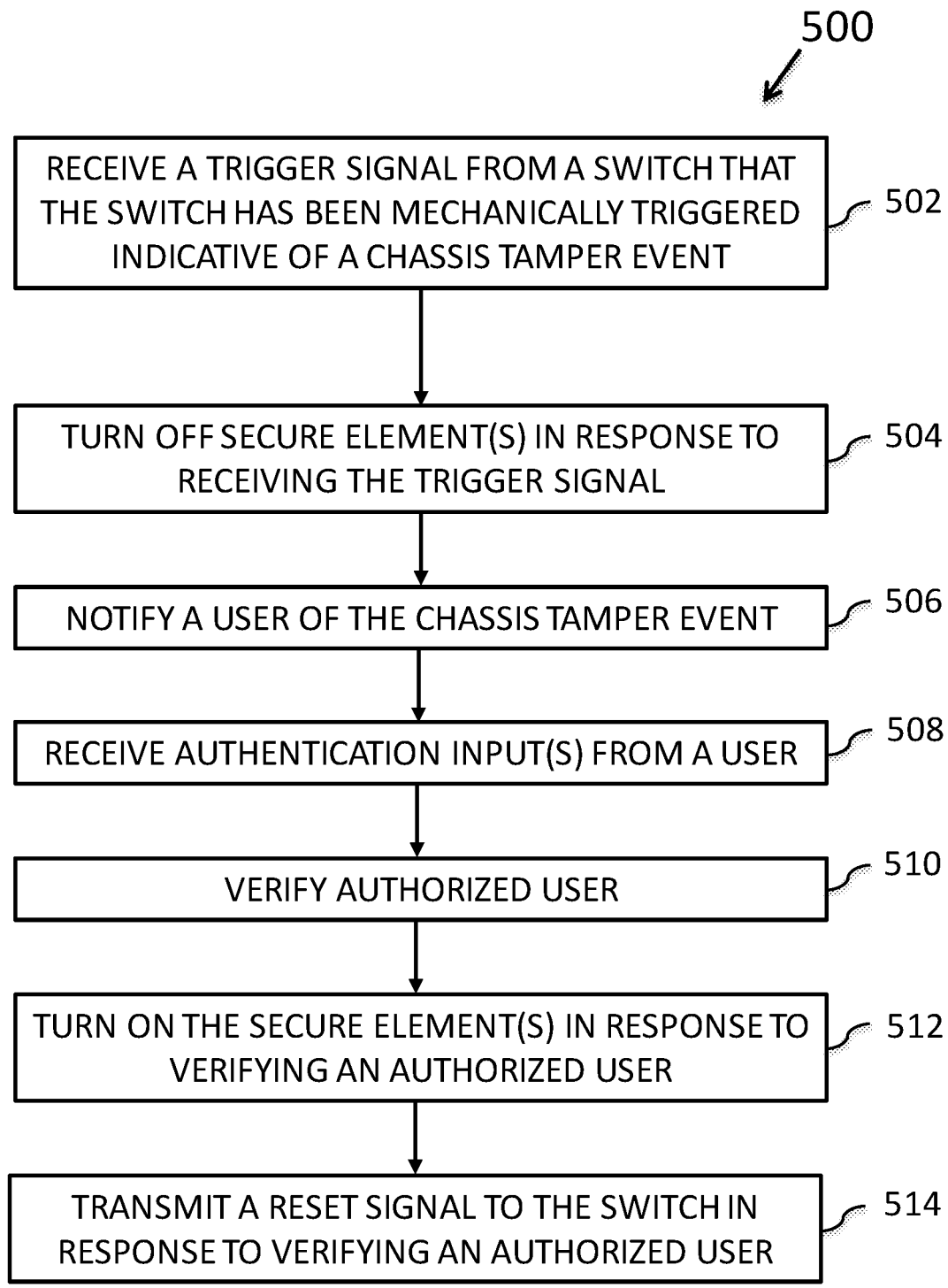
FIG. 5 is a schematic flow chart diagram illustrating another embodiment of a chassis security method for an apparatus.

FIG. 5 is a schematic flow chart diagram illustrating another embodiment of a chassis security method 500 for an apparatus 100. At least in the illustrated embodiment, the method 500 begins by a controller 204A, 204B, 300A, or 300B (e.g., one or more processors) receiving a trigger signal from a switch (e.g., switch S1 or S2) in a security switch 108 indicating that a tamper state of the switch S1 or S2 has been mechanically triggered and/or tripped (block 502). In some embodiments, the tamper state of the switch S1 or S2, in some embodiments, indicates that a chassis 102 has experienced a chassis tamper event. In other words, the chassis 102 has been opened and/or compromised.

In response to the trigger signal, the controller 204A, 204B, 300A, or 300B turns OFF one or more secure elements 106 (block 504) and notifies a user of the chassis tamper event (block 506). The controller 204A, 204B, 300A, or 300B receives one or more authentication inputs from the user (block 508) and verifies whether the user is an authorized user (block 510). The user can be verified as an authorized user using any of the techniques and/or method discussed elsewhere herein.

The controller 204A, 204B, 300A, or 300B then turns ON the one or more secure elements 106 in response to verifying that the user is an authorized user (block 512). In further response to verifying that the user is an authorized user, the controller 204A, 204B, 300A, or 300B transmits a reset signal to the switch S1 or S2 to reset to the switch S1 or S2 (block 514). The switch S1 or S2 may be reset using any of the reset techniques and/or methods discussed elsewhere herein.

Figure 6:
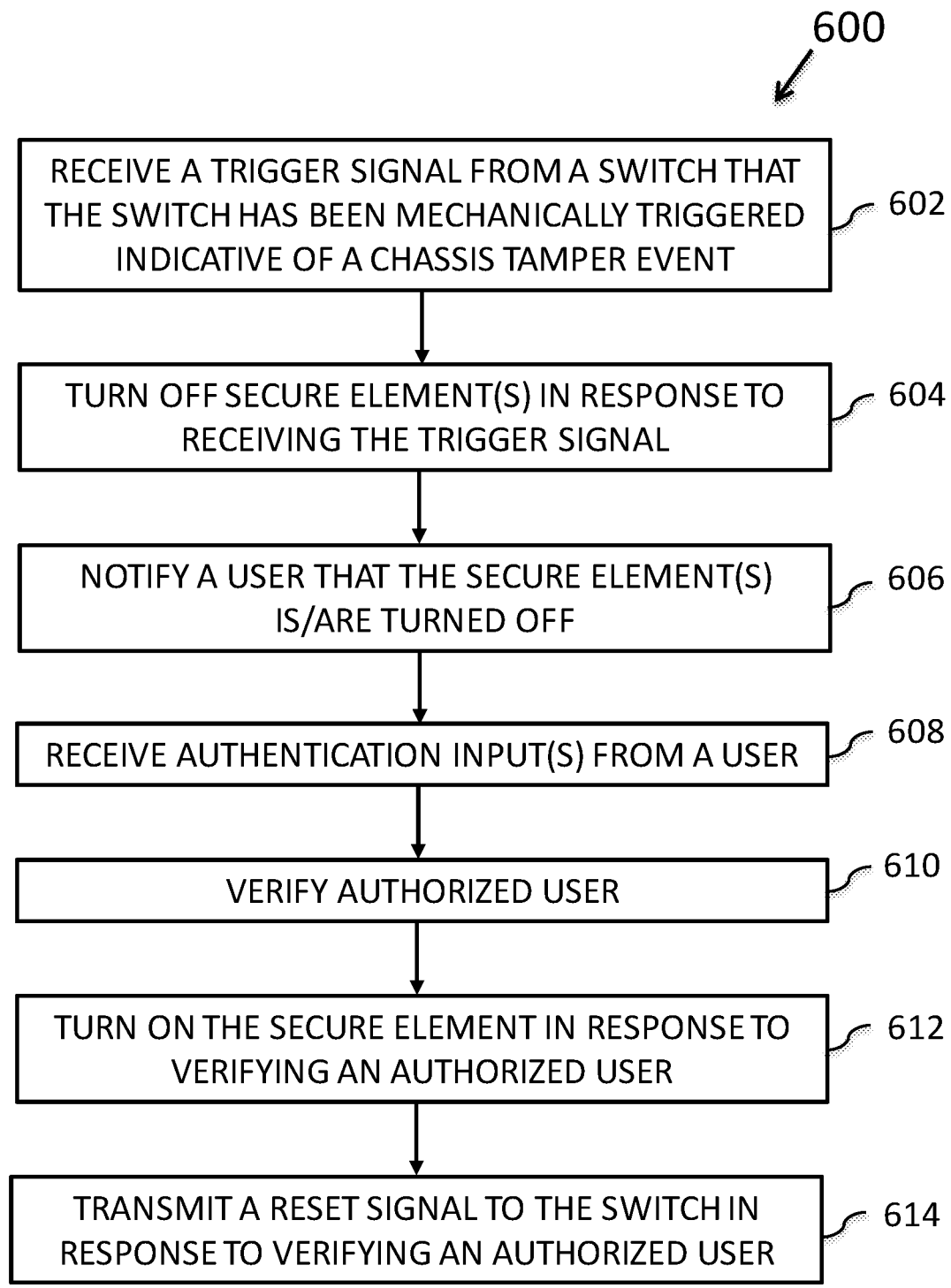
FIG. 6 is a schematic flow chart diagram illustrating yet another embodiment of a chassis security method for an apparatus.

FIG. 6 is a schematic flow chart diagram illustrating yet another embodiment of a chassis security method 600 for an apparatus 100. At least in the illustrated embodiment, the method 500 begins by a controller 204A, 204B, 300A, or 300B (e.g., one or more processors) receiving a trigger signal from a switch (e.g., switch S1 or S2) in a security switch 108 indicating that a tamper state of the switch S1 or S2 has been mechanically triggered and/or tripped (block 602). In some embodiments, the tamper state of the switch S1 or S2, in some embodiments, indicates that a chassis 102 has experienced a chassis tamper event. In other words, the chassis 102 has been opened and/or compromised.

In response to the trigger signal, the controller 204A, 204B, 300A, or 300B turns OFF one or more secure elements 106 (block 604) and notifies a user that the secure element(s) 106 is/are turned OFF (block 606). The controller 204A, 204B, 300A, or 300B receives one or more authentication inputs from the user (block 608) and verifies whether the user is an authorized user (block 610). The user can be verified as an authorized user using any of the techniques and/or method discussed elsewhere herein.

The controller 204A, 204B, 300A, or 300B then turns ON the one or more secure elements 106 in response to verifying that the user is an authorized user (block 612). In further response to verifying that the user is an authorized user, the controller 204A, 204B, 300A, or 300B transmits a reset signal to the switch S1 or S2 to reset to the switch S1 or S2 (block 614). The switch S1 or S2 may be reset using any of the reset techniques and/or methods discussed elsewhere herein.

Figure 7:
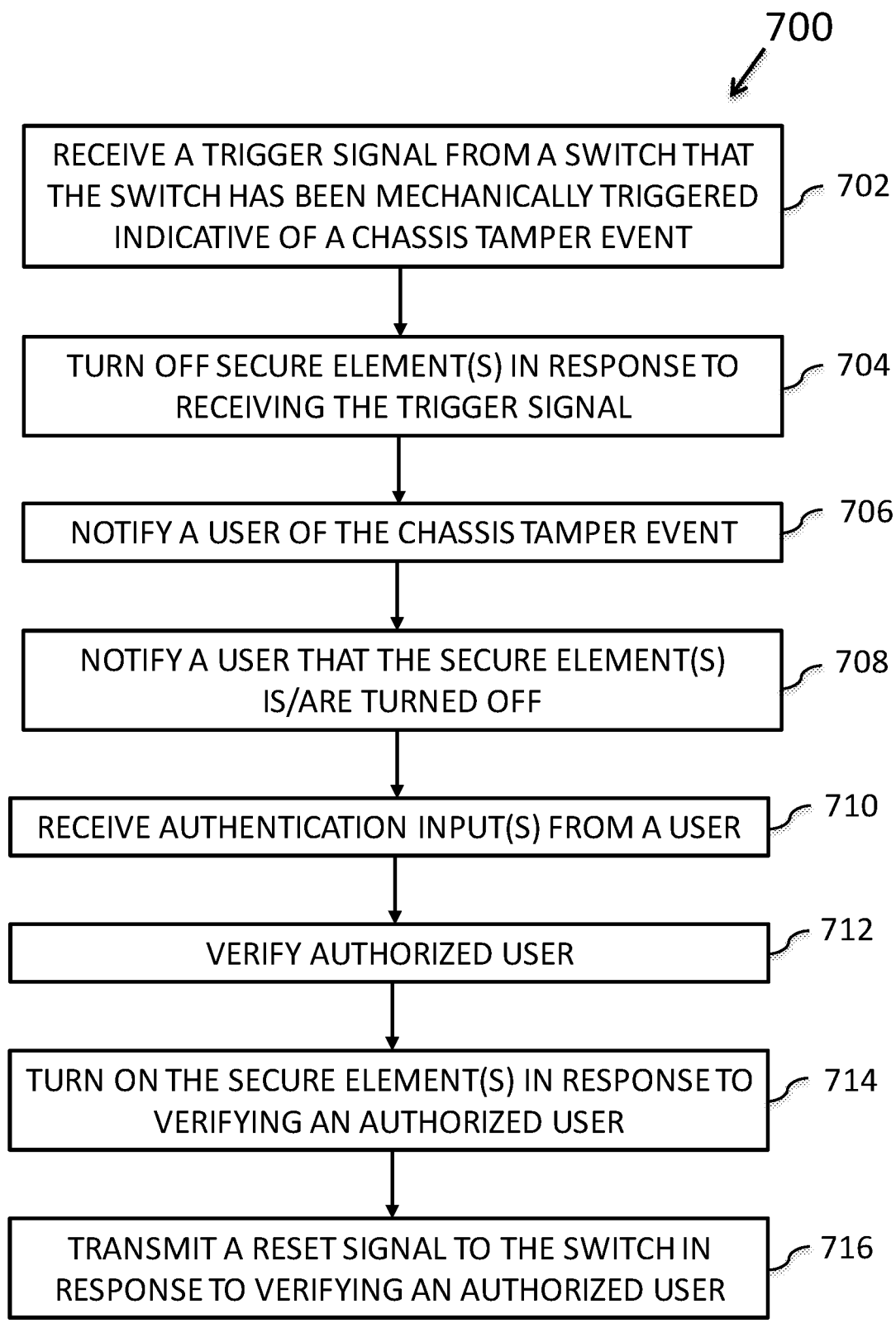
FIG. 7 is a schematic flow chart diagram illustrating still another embodiment of a chassis security method for an apparatus.

FIG. 7 is a schematic flow chart diagram illustrating still another embodiment of a chassis security method 700 for an apparatus 100. At least in the illustrated embodiment, the method 700 begins by a controller 204A, 204B, 300A, or 300B (e.g., one or more processors) receiving a trigger signal from a switch (e.g., switch S1 or S2) in a security switch 108 indicating that a tamper state of the switch S1 or S2 has been mechanically triggered and/or tripped (block 702). In some embodiments, the tamper state of the switch S1 or S2, in some embodiments, indicates that a chassis 102 has experienced a chassis tamper event. In other words, the chassis 102 has been opened and/or compromised.

In response to the trigger signal, the controller 204A, 204B, 300A, or 300B turns OFF one or more secure elements 106 (block 704), notifies a user of the chassis tamper event (block 706), and notifies the user that the secure element(s) 106 is/are turned OFF (block 708). The controller 204A, 204B, 300A, or 300B receives one or more authentication inputs from the user (block 710) and verifies whether the user is an authorized user (block 712). The user can be verified as an authorized user using any of the techniques and/or method discussed elsewhere herein.

The controller 204A, 204B, 300A, or 300B then turns ON the one or more secure elements 106 in response to verifying that the user is an authorized user (block 714). In further response to verifying that the user is an authorized user, the controller 204A, 204B, 300A, or 300B transmits a reset signal to the switch S1 or S2 to reset to the switch S1 or S2 (block 716). The switch S1 or S2 may be reset using any of the reset techniques and/or methods discussed elsewhere herein.

Figure 8:
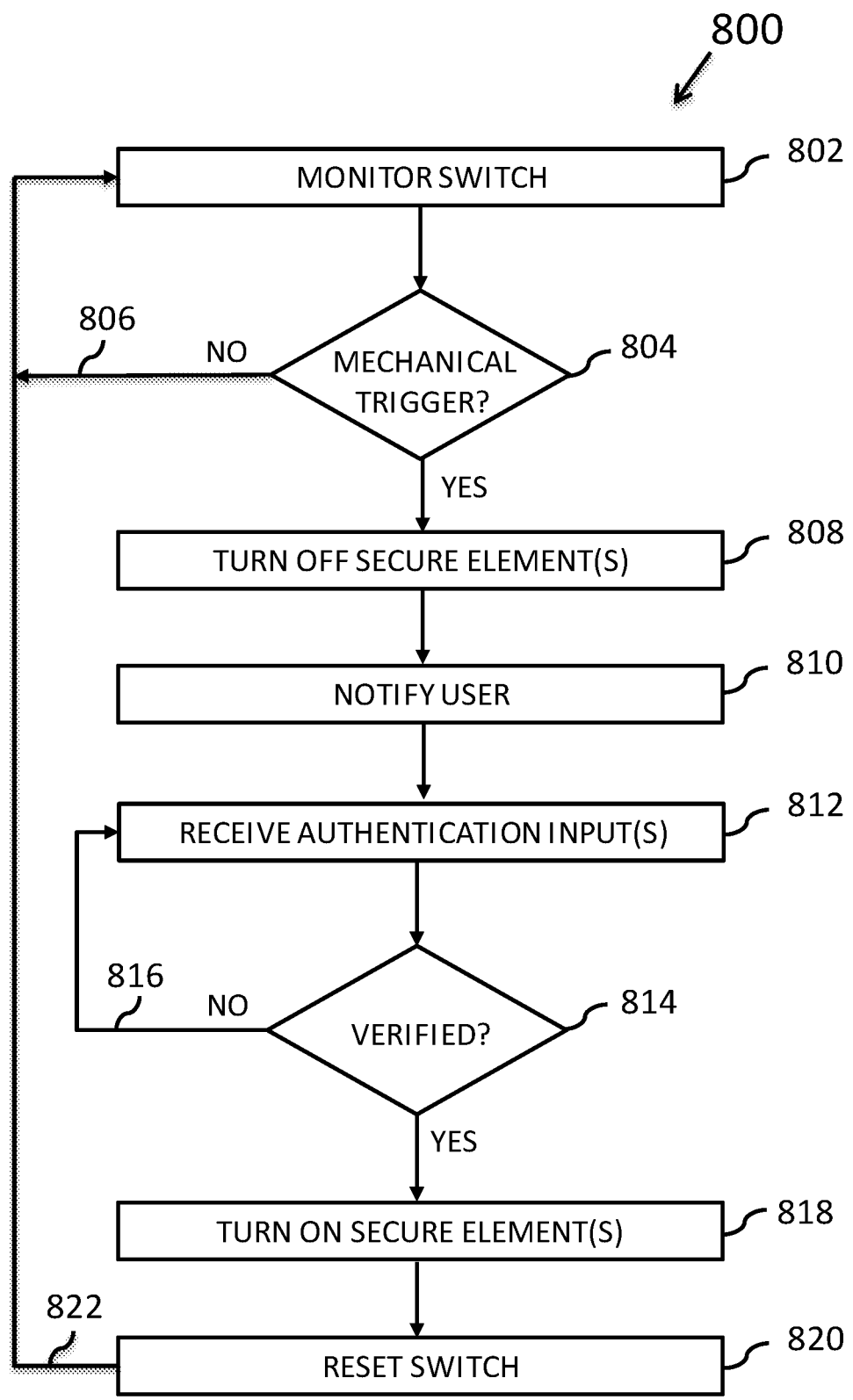
FIG. 8 is a schematic flow chart diagram illustrating an embodiment of a chassis security method for an apparatus.

FIG. 8 is a schematic flow chart diagram illustrating an embodiment of a chassis security method 800 for an apparatus 100. At least in the illustrated embodiment, the method 800 begins by a controller 204A, 204B, 300A, or 300B (e.g., one or more processors) monitoring a switch S1 or S2 (block 802) to detect and/or determine whether the switch S1 and S2 has experienced a mechanical trigger indicative of a chassis tamper event (block 804).

In response to the switch S1 and S2 not experiencing a mechanical trigger (e.g., a "NO" in block 804), the controller 204A, 204B, 300A, or 300B continues monitoring the switch S1 or S2 (return 806). In response to the switch S1 and S2 experiencing a mechanical trigger (e.g., a "YES" in block 804), the controller 204A, 204B, 300A, or 300B turns OFF one or more secure elements 106 (block 808) and sends a notification to the user (block 810). The notification can notify the user of the chassis tamper event and/or notify the user that the secure element(s) 106 is/are turned OFF.

The controller 204A, 204B, 300A, or 300B receives one or more authentication inputs from the user (block 812) and verifies whether the user is an authorized user (block 814). The user can be verified as an authorized user using any of the techniques and/or method discussed elsewhere herein.

In response to the user not being verified as an authorized user (e.g., a "NO" in block 814), the controller 204A, 204B, 300A, or 300B does nothing and/or waits to receive one or more authentication inputs in block 812 (return 816). In response to the user being verified as an authorized user (e.g., a "YES" in block 814), the controller 204A, 204B, 300A, or 300B turns ON the one or more secure elements 106 (block 818).

The controller 204A, 204B, 300A, or 300B can then transmit a reset signal to the switch S1 or S2 to reset to the switch S1 or S2 (block 820). The switch S1 or S2 may be reset using any of the reset techniques and/or methods discussed elsewhere herein. The controller 204A, 204B, 300A, or 300B then returns to monitoring the switch S1 or S2 in block 802 (return 822).

The various embodiments disclosed herein allow and/or enable a chassis tamper event to be detected both when the apparatus 100 has power and when the apparatus does not have power. Because the apparatus 100 can detect a chassis tamper event when the apparatus 100 does not have power, the various embodiments disclosed herein may not consider a power loss state as a chassis tamper event.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claim is:

1. An apparatus, comprising:
a chassis including a secure area housing a secure element within the chassis; and
a security switch coupled between the chassis and the secure area, the security switch comprising a switch and a processor,
wherein:
the switch is configured to mechanically trigger to a tamper state from a non-tamper state in response to a chassis tamper event occurring between the chassis and the secure area and to be electrically reset to the non-tamper state from the tamper state in response to receiving a reset signal from the processor,
the chassis tamper event comprises the chassis being physically separated from the secure area, and
the processor is configured to transmit the reset signal to the switch in response to verifying a set of authentication inputs from a user.

2. The apparatus of claim 1, wherein the switch comprises a latching electromechanical push button switch.

3. The apparatus of claim 2, wherein the latching electromechanical push button switch comprises one of a pull-up resistor circuit and a pull-down resistor circuit.

4. The apparatus of claim 1, wherein:
the chassis includes an information handling device chassis; and
the secure element comprises a computing component of an information handling device.

5. The apparatus of claim 4, wherein:
the information handling device comprises one of a laptop computing device and a desktop computing device;
the information handling device chassis comprises a corresponding one of a laptop chassis and a desktop chassis; and
the computing component of the information handling device comprises a motherboard.

6. The apparatus of claim 1, wherein:
the switch is configured to transmit a trigger signal to the processor in response to being mechanically triggered;
the processor is configured to turn OFF the computing component in response to receiving the trigger signal; and
the processor is further configured to turn ON the secure element in response to verifying the set of authentication inputs from the user.

7. The apparatus of claim 1, wherein:
the processor is further configured to turn ON the secure element in response to verifying the set of authentication inputs from the user.

8. The apparatus of claim 1, wherein:
being physically separated from the secure area comprises being physically separated from the secure area by a predetermined amount of space.

9. A method, comprising:
receiving, by a processor, a trigger signal from a switch that a tamper state of the switch has been mechanically triggered from a non-tamper state to the tamper state in response to a chassis tamper event occurring between a chassis and a secure area housing a secure element; and
transmitting, by the processor, a reset signal to the switch to electrically reset the switch from the tamper state to the non-tamper state,
wherein:
the chassis tamper event comprises the chassis being physically separated from the secure area, and
the processor transmits the reset signal to the switch in response to verifying a set of authentication inputs from a user.

10. The method of claim 9, further comprising:
turning OFF the secure element in response to receiving the trigger signal; and
performing one of:
notifying a user of the occurrence of the chassis tamper event, and
notifying the user that the processor has turned OFF the secure element in response to the chassis tamper event.

11. The method of claim 10, further comprising:
receiving the set of authentication inputs from the user;
verifying that the user is an authorized user based on the received set of authentication inputs; and
turn ON the secure element in response to verifying that the user is an authorized user.

12. The method of claim 9, further comprising:
turning OFF the secure element in response to receiving the trigger signal;
notifying the user of the occurrence of the chassis tamper event; and
notifying the user that the processor has turned OFF the secure element in response to the chassis tamper event.

13. The method of claim 12, further comprising:
receiving the set of authentication inputs from the user;
verifying that the user is an authorized user based on the received set of authentication inputs; and
turn ON the secure element in response to verifying that the user is an authorized user.

14. The method of claim 9, wherein being physically separated from the secure area comprises being physically separated from the secure area by a predetermined amount of space.

15. A computer program product comprising a non-transitory computer-readable storage medium including program instructions embodied therewith, the program instructions executable by a processor to cause the processor to:
receive a trigger signal from a switch that a tamper state of the switch has been mechanically triggered from a non-tamper state to the tamper state in response to a chassis tamper event occurring between a chassis and a secure area housing a secure element; and
transmit a reset signal to the switch to electrically reset the switch from the tamper state to the non-tamper state,
wherein:
the chassis tamper event comprises the chassis being physically separated from the secure area, and
the processor transmits the reset signal to the switch in response to verifying a set of authentication inputs from a user.

16. The computer program product of claim 15, wherein the program instructions further cause the processor to:
turn OFF the secure element in response to receiving the trigger signal; and
perform one of:
notify the user of the occurrence of the chassis tamper event, and
notify the user that the processor has turned OFF the secure element in response to detection of the chassis tamper event.

17. The computer program product of claim 16, wherein the program instructions further cause the processor to:
receive the set of authentication inputs from the user;
verify that the user is an authorized user based on the received set of authentication inputs; and
turn ON the secure element in response to verifying that the user is an authorized user.

18. The computer program product of claim 15, wherein the program instructions further cause the processor to:
turn OFF the secure element in response to receiving the trigger signal;
notify the user of the occurrence of the chassis tamper event; and
notify the user that the processor has turned OFF the secure element in response to the chassis tamper event.

19. The computer program product of claim 18, wherein the program instructions further cause the processor to:
receive the set of authentication inputs from the user;
verify that the user is an authorized user based on the received set of authentication inputs; and
turn ON the secure element in response to verifying that the user is an authorized user.

20. The computer program product of claim 15, wherein being physically separated from the secure area comprises being physically separated from the secure area by a predetermined amount of space.

\* \* \* \* \*